June 6, 1950  R. H. SHARPE  2,510,261
HARVESTER FOR LOW GROWING CROPS
Filed April 22, 1946  3 Sheets-Sheet 2

INVENTOR
R. H. Sharpe
BY
ATTORNEYS

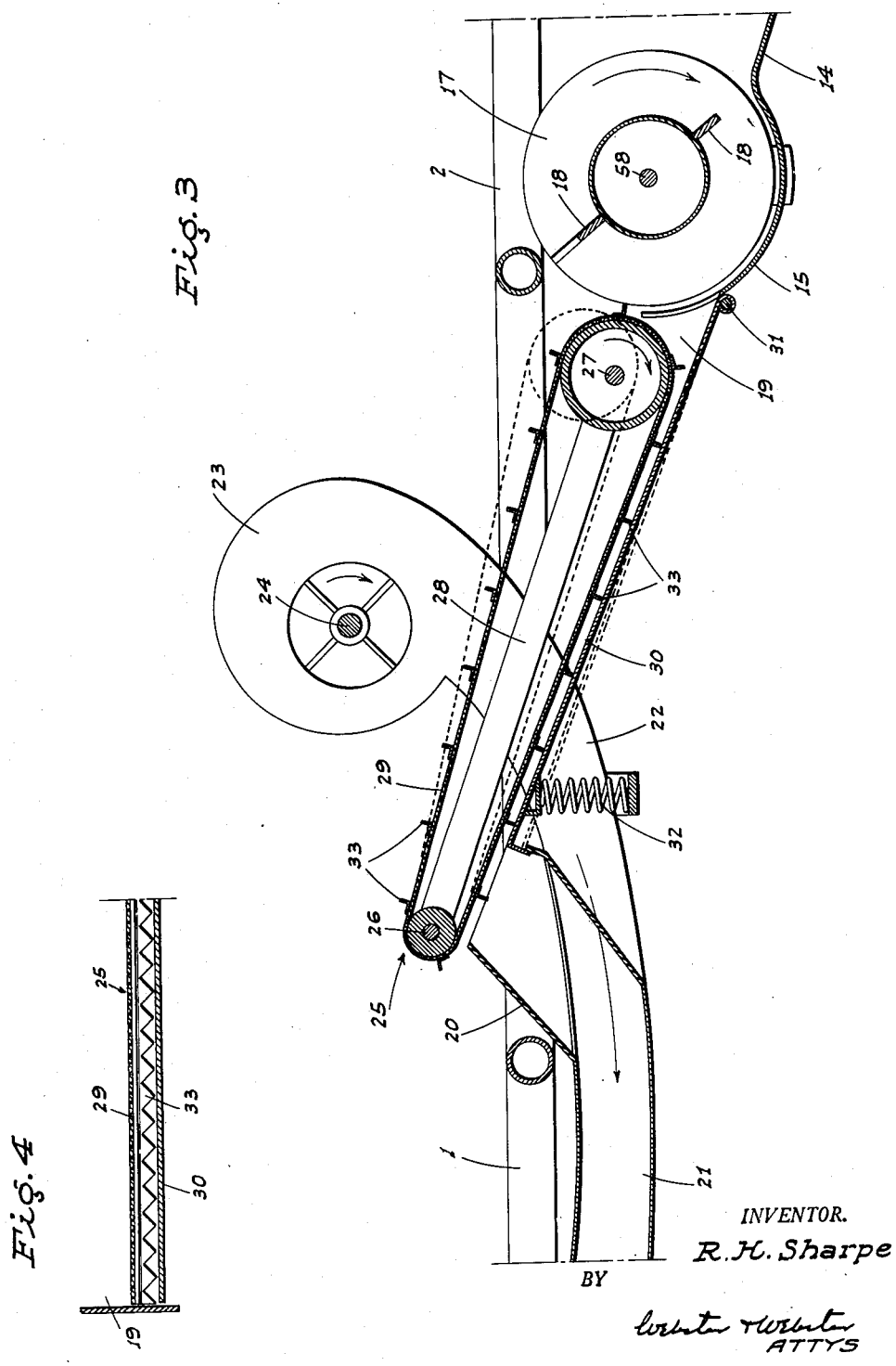

Patented June 6, 1950

2,510,261

UNITED STATES PATENT OFFICE 2,510,261

HARVESTER FOR LOW GROWING CROPS

Robert H. Sharpe, Stockton, Calif.

Application April 22, 1946, Serial No. 663,913

6 Claims. (Cl. 56—23)

This invention relates generally to an improved harvester.

In particular the invention is directed to, and it is an object to provide, a self-propelled harvester especially designed for use to harvest green crops, such as field grown peas. This type of crop is harvested by mowing the green vines, and then loading the vines on trucks for transport to a stationary threshing or shelling machine.

Another object of the invention is to provide an effective harvester which is operative to cut low growing, entangled green crops, and to readily load the cut vines into a truck moving adjacent the harvester.

A further object of the invention is to convey the cut vines from the cutting and initial feed mechanism of the harvester to an elevated discharge point by means of a conveyor assembly which includes a novel endless conveyor and trough arrangement which delivers the cut vines into a conduit whence said vines are fed by an air blast to said elevated discharge point.

An additional object is to provide a harvester, as above, wherein the conduit includes a turntable mounted, adjustable spout arranged to facilitate delivery of the cut vines into the adjacent truck.

It is also an object to provide a self-propelled harvester which includes a novel propelling mechanism, and steering arrangement, whereby the implement may be manipulated in the field with ease.

A further object of the invention is to produce a practical device and one which will be exceedingly effective for the purpose for which it is designed.

These objects are accomplished by means of such structure and relative arrangement of parts as will fully appear by a perusal of the following specification and claims.

In the drawings:

Fig. 3 is an enlarged fragmentary sectional elevation showing mainly the conveyor assembly.

Fig. 4 is an enlarged fragmentary cross section of the drag conveyor.

Fig. 5 is an enlarged fragmentary sectional elevation showing the manner of mounting the discharge spout on the turntable.

Figure 1:
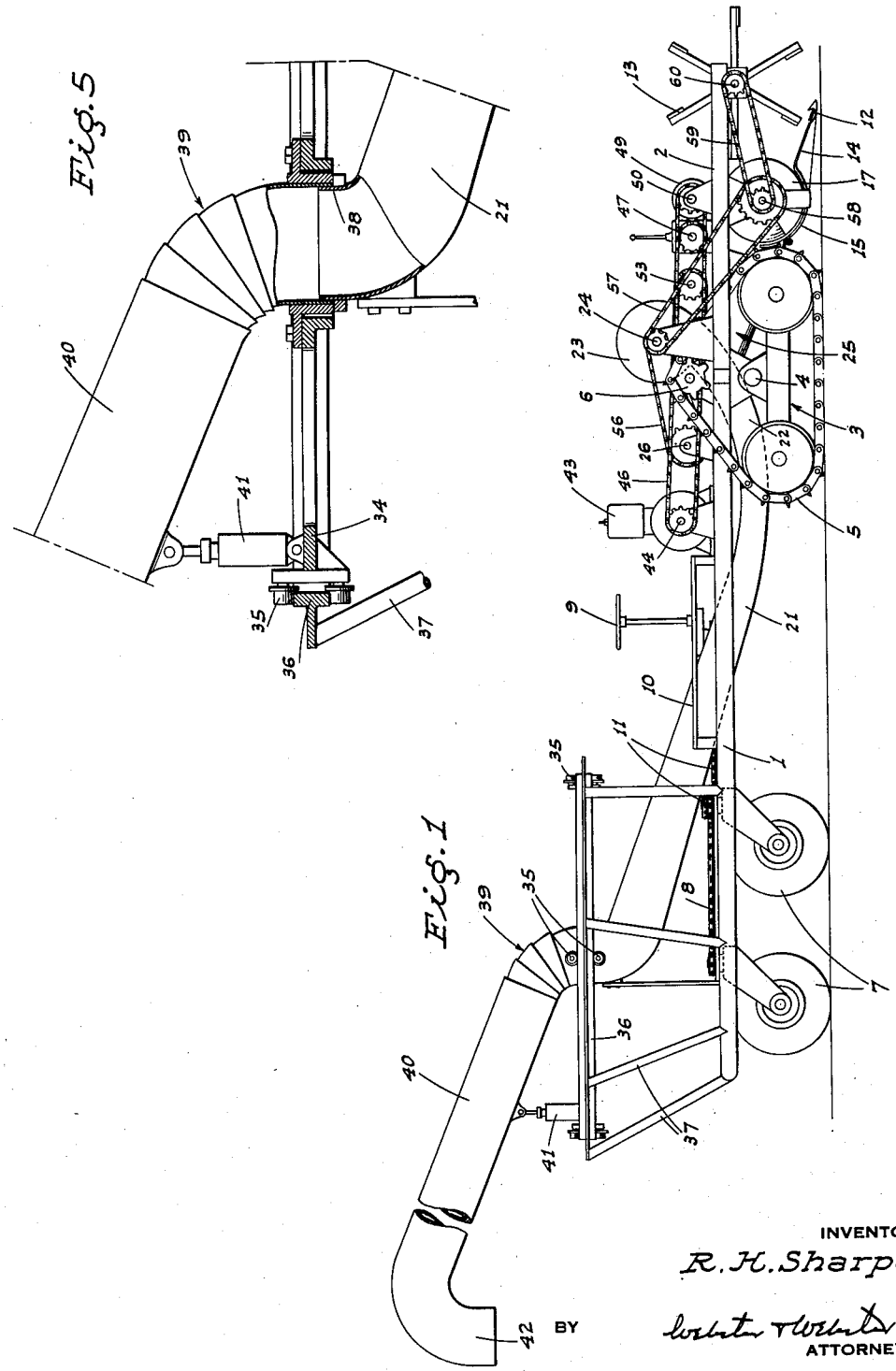
Fig. 1 is a side elevation of the harvester.

Referring now more particularly to the characters of reference on the drawings, the harvester comprises a horizontal, elongated main frame 1 which is increased in width at its forward end, as at 2. Such main frame 1 is supported, adjacent but short of its forward end, by means of a pair of transversely spaced, endless track units 3 pivoted in connection with said main frame, as at 4; each such unit including an endless track 5 which runs at the top on a corresponding drive sprocket 6 journaled in connection with the main frame and driven in the manner hereinafter described.

Adjacent its rear end the main frame 1 is supported, centrally of its sides, by a pair of tandem-mounted caster wheels 7 which are connected together for steering, in unison, by an endless chain and sprocket unit 8. A steering wheel 9 upstands from an operator's platform 10, and is connected, in steering relation to the caster wheels 7, by means of a steering connection, indicated generally at 11.

Ahead of the endless track units 3 the harvester is fitted with a transversely extending sickle bar 12, and a pick-up reel 13 is mounted on the forward end portion 2 of the main frame 1 with its axis ahead of said sickle bar, whereby said reel is operative to sweep or deliver vines, which grow adjacent the ground, directly onto and across the sickle bar 12.

Rearwardly of the sickle bar the harvester includes an upwardly inclined apron 14 which merges, at its upper edge, with a transversely extending concave 15. A transversely extending auger conveyor assembly 16 is journaled in connection with the forward portion 2 of the main frame 1 and runs in the concave 15. The auger conveyor assembly 16 includes right and left-hand auger sections 17, at opposite end portions thereof, as shown, and said auger sections are operative to deliver, upon rotation of the auger assembly in the direction shown by the arrow in Fig. 3, toward the center of said assembly. At the center portion of said auger conveyor assembly 16 the vanes of the auger sections 17 feather out as straight radial vanes 18 disposed on opposite sides of the auger axis. The concave 15 is cut away directly to the rear of the vanes 18, whereby said concave opens at the center into the lower open end of a rearwardly and upwardly inclined trough 19. At its upper end the trough 19 is disposed to deliver into the open upper end of a hopper 20, which leads, at a rearward and downward incline, into a relatively large, longitudinally extending conduit 21 supported in the main frame substantially centrally of the sides thereof.

Ahead of the hopper 20 the conduit 21 is branched, as at 22, and said branches each connect with a corresponding heavy-duty blower 23, which blowers are suitably supported from the main frame 1. The blowers 23 are simultaneously driven by a common blower shaft 24. The drive for this blower shaft 24 is hereinafter described.

An endless drag conveyor, indicated generally at 25, is disposed and runs lengthwise in the trough 19 for substantially the full length thereof, said endless conveyor 25 including a top roller supporting shaft 26, a bottom roller supporting shaft 27, frame 28, and a flat endless belt or draper 29. The above described endless conveyor 25 is mounted, for floating action in the trough 19, about the top shaft 26 as an axis, whereby to compensate for the load which is being conveyed up the trough 19 by said conveyor. This swinging motion is clearly illustrated in Fig. 3 by the full and dotted-line positions of the conveyor 25.

To further compensate for the load in the trough 19, the bottom 30 of the latter is formed as a separate member, hinged at its lower end, as at 31, for up and down movement about said hinge as an axis; the upper end portion of the trough bottom being spring-urged from below, as at 32, whereby said trough bottom may yield downwardly as load conditions may require.

The flat endless belt or draper 29 is fitted, on the outside thereof, and at spaced points, with transverse cleats 33 which are serrated, as shown. Said cleats, when in the lower run of the belt 29, ride the trough bottom 30, and the serration of such cleats serves to assure positive feed of the vines up the trough by the conveyor 25 during operation of the machine, as hereinafter described.

As shown, the blowers 23 are disposed above and to opposite sides of the conveyor 25, the latter extending between the branches 22 of conduit 21 ahead of the hopper 20.

Rearwardly of the hopper 20 the conduit extends longitudinally of the main frame, at an upward and rearward incline, to the center of a turntable 34 rotatably supported by roller units 35 running in connection with a horizontal, circular rail 36 mounted above the rear end of the main frame 1 by posts 37.

At the center of the turntable the conduit 21 includes a vertical, non-rotatable neck 38 coupled with the lower, collar-supported end of a flexible elbow 39 on the inner end of an upwardly and outwardly inclined discharge spout 40 mounted on the turntable for rotation therewith. The discharge spout 40 is supported, from the turntable adjacent the periphery of the latter, and for vertical adjustment of the inclination of said spout, by a fluid pressure actuated power cylinder 41. This power cylinder is regulated by an operator-controlled, fluid pressure system (not shown). At its outer and upper end the discharge spout 40 is fitted with a down-turned discharge gooseneck 42.

The drive mechanism for the sprockets 6 which drive the endless track units 3 comprises the following:

An engine 43, of any suitable type, is mounted on the main frame directly ahead of the operator's platform 10, and said engine includes a double-ended drive shaft 44, each end of which includes a clutch 45 therein. The left-hand end of the drive shaft 44 is connected by an endless chain and sprocket unit 46 with a cross shaft 47 on the frame generally above the auger conveyor assembly 16; said cross shaft 47 having a transmission 48 interposed therein.

From the transmission 48 a drive is imparted through a bevel gear unit, as shown, to a differential 49 interposed in another cross shaft 50. Endless chain and sprocket units 51 drive rearwardly from opposite ends of the cross shaft 50 to the sprockets 6. In the above described manner the endless track units 3 are effectively and differentially driven from the engine 43.

Under certain operating conditions it is desirable that the differential drive be locked out, and this is accomplished as follows:

Endless chain and sprocket units 52 extend forwardly from the same axial support as the sprockets 6, and connect, at their forward ends, with a cross shaft 53 having a sleeve clutch 54 interposed therein. The sleeve clutch 54 is normally disengaged, which permits of the differential drive, previously described. However, if direct non-differential drive of the endless track units 3 is desired, then the sleeve clutch 54 is coupled, which in effect blocks out the differential 49; i. e. prevents such differential from functioning as such.

The blower shaft 24 is driven from the right-hand end of drive shaft 44 by a multiple endless belt and pulley unit 55. In turn the blower shaft 24 drives an endless chain and sprocket unit 56, which rotates the top shaft 26 of the endless drag conveyor 25, whereby to operate the latter.

At its left-hand outer end the blower shaft 24 is connected to an endless chain and sprocket unit 57, which drives the corresponding end of the shaft 58 of the auger conveyor assembly. In turn the shaft 58, working through an endless chain and sprocket unit 59, drives the shaft 60 of the reel 13. The sickle bar 12 is driven, from the auger shaft 58, by driving connections 61.

*Operation*

In operation of the above described green crop harvester, the same is propelled along the ground by the endless track units 3, and with forward movement of the implement the vines are swept, by the reel 13, to and across the sickle bar 12, which severs said vines from the roots. Thereafter, the reel sweeps the cut vines into the auger conveyor assembly 16, whence the auger sections 17 feed the vines to the center of said assembly. At the center of the auger conveyor assembly the vanes 18 deliver the vines from the concave 15, through the central back opening in the same, into the lower end of the trough 19. In the trough the lower run of the cleated, endless belt or draper 29 of conveyor 25 engages said vines and carries the same up the yieldable trough bottom 30, and discharges the vines into the hopper 20.

Figure 2:
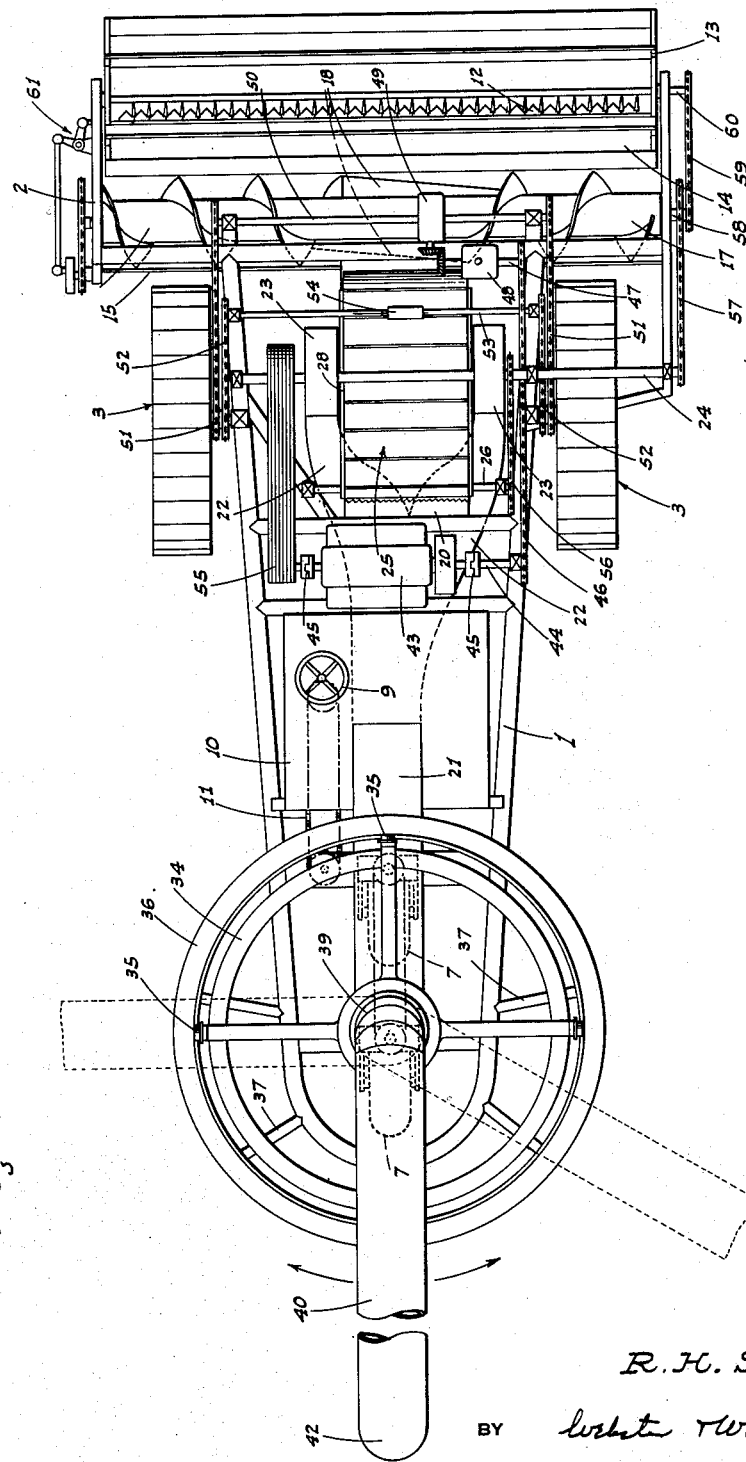
Fig. 2 is a plan view of the same.

From the hopper 20 the vines are caught in the air blast in the conduit 21 and thus forcefully fed through said conduit, spout 40, and discharge gooseneck 42. From the gooseneck 42 the cut vines fall into the body of a truck traveling preferably alongside the harvester. The turntable 34, as well as the power cylinder 41, are adjusted to positions so that the spout 40 and gooseneck 42 are disposed in proper relationship to the truck body. In operation, the spout 40 usually extends laterally of the harvester, as shown in dotted lines in Fig. 2.

With the improved green crop harvester, as herein described, low growing and entangled crops, such as field peas, may be harvested rapidly and effectively with a minimum of loss. Further, the cutting and initial feed mechanism, together with the described conveyor assembly, is so designed that the feed of the cut vines is free and unobstructed, and there is no tendency for such vines to choke up in the implement when the same is in use.

From the foregoing description it will be readily seen that there has been produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described the invention, the following is claimed as new and useful, and upon which Letters Patent are desired:

1. A harvester comprising a frame supported above and for movement along the ground, a driven, vine cutting device mounted in connection with the forward portion of the frame adjacent the ground, means supported by the frame operative to receive cut vines from the cutting device and to convey the vines therefrom, a relatively large conduit mounted on the frame, a driven blower connected to the conduit at one end to create an air stream through said conduit, said vine conveying means discharging into the conduit intermediate its ends, and a discharge spout on the conduit at the end opposite the blower; there being a turntable mounted on the frame, the spout being mounted on and projecting outwardly from above the turntable, and means coupling adjacent ends of the spout and conduit in relatively rotatable relation axially of said turntable.

2. A harvester comprising a frame supported above and for movement along the ground, a driven, vine cutting device mounted in connection with the forward portion of the frame adjacent the ground, means supported by the frame operative to receive cut vines from the cutting device and to convey the vines therefrom, a relatively large conduit mounted on the frame, a driven blower connected to the conduit at one end to create an air stream through said conduit, said vine conveying means discharging into the conduit intermediate its ends, and a discharge spout on the conduit at the end opposite the blower; there being a turntable mounted on the frame, the spout being mounted on and projecting outwardly from above the turntable, in vertically adjustable relation, means vertically adjustably supporting the spout from the turntable, and means coupling adjacent ends of the spout and conduit in relatively rotatable relation axially of said turntable.

3. A harvester comprising a frame supported above and for movement along the ground, a driven, vine cutting device mounted in connection with the forward portion of the frame adjacent the ground, means supported by the frame operative to receive cut vines from the cutting device and to convey the vines therefrom, a relatively large conduit mounted on the frame, a driven blower connected to the conduit at one end to create an air stream through said conduit, said vine conveying means discharging into the conduit intermediate its ends, and a discharge spout on the conduit at the end opposite the blower; there being a turntable mounted on the frame, the spout being mounted on and projecting outwardly from above the turntable in vertically adjustable relation, a fluid pressure actuated power cylinder vertically adjustably supporting the spout from the turntable, and means coupling adjacent ends of the spout and conduit in relatively rotatable relation axially of said turntable.

4. A harvester comprising a frame supported above and for movement along the ground, a driven, vine cutting device mounted in connection with the forward portion of the frame adjacent the ground, means supported by the frame operative to receive cut vines from the cutting device and to convey the vines therefrom, a relatively large conduit mounted on the frame, a driven blower connected to the conduit at one end to create an air stream through said conduit, said vine conveying means discharging into the conduit intermediate its ends, and a discharge spout on the conduit at the end opposite the blower; said vine conveying means including a trough into which the cut vines are delivered at one end, the trough feeding at the other end into the conduit, and an endless, drag conveyor mounted with the lower run thereof running in the trough, said endless, drag conveyor including serrated cross cleats which ride the bottom of the trough when in said lower run, said last named conveyor and the bottom of the trough being upwardly and downwardly yieldable, respectively.

5. A harvester comprising an elongated frame supported above and for movement along the ground, a sickle bar mounted in connection with the forward portion of the frame, an apron extending rearwardly from the sickle bar and formed at the rear as an upwardly facing concave, a driven, auger conveyor assembly supported from the frame and running in the concave, said auger conveyor assembly having spaced apart end portions arranged to deliver to the center of said assembly, means on the auger conveyor assembly at the center to discharge the vines rearwardly, a driven, endless conveyor assembly mounted on the frame at an upward and rearward incline, said endless conveyor assembly being arranged to receive vines from the auger conveyor assembly, a relatively large conduit on the frame lengthwise thereof, the conduit being branched at its forward end and straddling the endless conveyor assembly, blowers mounted on the frame and connected to said branches, an upstanding hopper on the conduit adjacent but to the rear of the branches, the endless conveyor assembly feeding to the hopper, and a discharge spout on the conduit at its rear end; there being a turntable on the frame, and the discharge spout being mounted on and projecting outwardly from the turntable.

6. A harvester comprising a frame supported above and for movement along the ground, a driven, vine cutting device mounted in connection with the forward portion of the frame adjacent the ground, means supported by the frame operative to receive cut vines from the cutting device and to convey the vines therefrom, a relatively large conduit mounted on the frame, a driven blower connected to the conduit at one end to create an air stream through said conduit, said vine conveying means discharging into the conduit intermediate its ends, and a discharge spout on the conduit at the end opposite the blower; said vine conveying means including a trough into which the cut vines are delivered at one end, the trough feeding at the other end into the conduit, and an endless, drag conveyor mounted with the lower run thereof running in the trough, said endless, drag conveyor including serrated cross cleats which ride the bottom of the trough when in said lower run, said endless drag conveyor and the bottom of the trough being upwardly and downwardly yieldable respectively; the yielding motion of said conveyor and said trough bottom being about transverse axes at opposite ends thereof.

ROBERT H. SHARPE.

REFERENCES CITED

The following references are of record in the file of this patent:

UNITED STATES PATENTS

| Number | Name | Date |
|---|---|---|
| 1,844,750 | Ellis | Feb. 9, 1932 |
| 1,897,611 | Grasswick | Feb. 14, 1933 |
| 2,426,922 | Carroll | Sept. 2, 1947 |

FOREIGN PATENTS

| Number | Country | Date |
|---|---|---|
| 133,119 | Switzerland | Aug. 1, 1929 |